United States Patent Office

3,164,518
Patented Jan. 5, 1965

3,164,518
PROCESS FOR TREATING INDIGESTION
IN RUMINANTS
Josef Mussill, Salzburg, Austria, and Rudolph Seiden, Kansas City, Mo., assignors to Haver-Lockhart Laboratories, Incorporated, Kansas City, Mo., a corporation of California, and Friedrich Jacoby & Co., Hallein-Kaltenhausen, Austria, a corporation of Austria
No Drawing. Filed July 2, 1962, Ser. No. 207,067
12 Claims. (Cl. 167—53)

This invention relates to a novel process of treating indigestion and alimentary intoxication associated there in ruminants and particularly, to a method of alleviating the syndromes associated with gastrointestinal disorders in ruminants, by administering to an animal so afflicted, a composition capable of supporting the development of the digestive organisms normally present in the rumen of the animal to return the metabolic processes of the ruminant to a normal condition as rapidly as practicable.

In attempting to treat gastric upsets in ruminants, many variables must be dealt with because of the complex nature of the metabolic processes and the many unbalanced conditions which require compensation in order to effect restoration of the well-being of the animal. Ruminants have, over thousands of years, developed a digestive system, and for that matter, a whole metabolic system, which is adapted to handle forage type rations composed of large amounts of roughage rather than grain and similar concentrates, with only small amounts of the latter being effectively metabolized in relatively short periods of time. In the constant effort to produce larger and faster gains in ruminants, feeders in recent times have attempted to reverse the diet of ruminants by feeding as much corn and other grains to the animals with a minimum quantity of forage type food products. In some instances, it has been noted that the rations fed to cattle for example, are far better adapted to single-stomached animals than to ruminants. Also, there are times when either by accident or ignorance, the amount of grain consumed by a ruminant may reach disastrous proportions.

The digestive physiology of single-stomached animals as compared with ruminants is sufficiently different to produce severe gastrointestinal upsets in the multi-stomached animals when the ruminants eat large quantities of high grain or carbohydrate rations even though the materials could be consumed by simple-stomached animals without digestive problems. In the simple-stomached animals, carbohydrates are broken down into utilizable glucose by enzymatic digestion in the gut. As is well known, glucose by itself is ready to enter the Krebs cycle to be phosphorylated and furnish energy, or to be converted into stored glycogen. Since digestion of carbohydrates by bacteria produces the lower fatty acids rather than glucose, the fatty acids must then be metabolically assimilated into glucose before the latter can be absorbed into the fluids on the animal's body. In the ruminant on a normal ration, metabolic assimilation of the fatty acids is handled quite readily, mostly in the liver but to a certain extent in the kidneys and the walls of the stomach.

However, in the ruminant animal which suddenly has access to large amounts of grain or a high carbohydrate ration, profound changes occur in the animal's system which, if unchecked, can produce serious syndromes and ultimately lead to death. Among the reactions which a ruminant can be expected to exhibit upon ingestion of excessive amounts of grain, are a rapid accumulation of lactic acid in the ruminant, a fall in ruminal pH, an abrupt rice of lactate circulating in the peripheral blood, and a decrease in blood volume along with hemoconcentration. Excessive grains or glucose ingestion can have fatal results in ruminants and accompanied by a fall in the pH in the rumen to between 4 and 5 in a few hours, destruction of protozoa and cellulotic bacteria, and a relatively large increase of Gram-positive organisms particularly *Streptococcus bovis* which is a lactic acid producer. It is to be understood that a low pH in the rumen produces stasis of that organ which persists for hours even after the pH is restored to a normal level. Coupled with changes in the pH of the stomach, and alterations in the microflora and microfauna, and also variation in the end products of these changes, is the shift in osmotic tensions within the animal's system which must occur when excessively large amounts of grain are placed in the rumen. It has also been determined that engorged animals having the most trouble are those which are at first deprived of water. If the ruminants gain access to water after being engorged a few hours, the condition is much harder to alleviate. The reason for the problems presented by engorged animals which were initially deprived of water, relates to the fact that fluids and electrolytes can traverse the wall of the rumen with relative ease depending on osmotic tensions between the tissues and the rumen content. Thus, a rumen full of relatively dry grain can be compared to a blotter which will attract fluids from the remaining portion of the body until equilibrium is established. This condition is believed to account for the tarry-like blood (hemoconcentration) and the dehydration seen in ruminants which have received an excess of grain or high carbohydrate material. Since grain engorgement causes a low rumen pH, the animal's body will attempt to normalize the concentration of sodium, potassium, magnesium chloride, carbon dioxide, and phosphate ions in the blood and tissues. Upon gaining access to water, the dehydrated animals fill up and the osmotic flow is reserved from the now hydrated rumen to the dehydrated tissues. Fluid leaving the rumen carries with it very large quantities of lactic acid, producing thirst and a profound acidosis, the symptoms of which are ataxia, hyperventilation, coma and, if unchecked, death.

Even if it is assumed that a certain amount of lactic acid is converted to glycogen in these animals, it must be remembered that in order for this conversion to occur, lactic acid must first be converted to pyruvic acid through the enzymatic action of lactic dehydrogenase. However, it is believed that the supply of this enzyme becomes exhausted long before all conversion of the lactic acid can occur, thereby leaving the animal in a severe state of acidosis.

It is to be understood however that the types of fatty acids produced within the digestive system of a ruminant, the types of rumen bacteria and protozoa present, and the pH of the stomach contents, vary considerably with the type of food consumed. This is true for hay as well as grain. Minor changes which may be made in the ration of the animals, or changes which occur slowly, usually do not result in severe digestive upsets. However, when the animals receive excessive quantities of grain or high carbohydrate materials, profound changes occur throughout the digestive system of the animal and particularly in the rumen. As previously stated, in almost all types of indigestion or gastric upset in cattle, sheep and goats, the contents of the rumen become more acid. This may be attributed to the fact that (1) rumen motility is slowed by the mass inside, and by the products of intoxication within the rumen; (2) lactic acid-producing bacteria which are normally present in limited numbers increase tremendously inasmuch as the climate in a rumen overloaded with grain and high carbohydrate substances is perfect for growth of the bacteria; (3) cellulose bacteria which normally digest fiber and keep the pH of the rumen in balance with the protozoa are decreased as the acid-producing bacteria increase; and (4) as the acid-producing bacteria increase in numbers, the oxygen content of the rumen is changed from the normal anaerobic state to one which is aerobic; thus the rH value is increased (redox potential). Since the high rH level in the rumen is not conducive to propagation of protozoa, the original reduction in numbers of the digestive organisms is further compounded.

Studies have indicated that although reduction of pH in the rumen of an animal afflicted with severe digestive upset is important, such lowering of the pH is not a complete answer to the problem especially in those cases where the contributing factor has been the excessive ingestion of simple carbohydrates such as are found in most cereal grains. The bound hydrogen in the weakly dissociated organic acids produced by metabolism of the excessive amounts of cereal grains, can produce as much toxemia and liver damage as does the high pH caused by the few hydrogen ions absorbed by the animal's system from the overloaded rumen. In conditions of high pH as well as excessive amounts of weakly dissociated organic acids, symptoms of severe digestive upset in a ruminant can be diagnosed by apparent gastrointestinal pain, diarrhea, liver toxicity and similar syndromes. If the conditions are allowed to continue for several hours prior to treatment, metabolic acidosis and dehydration can lead to eventual death of the animal.

It is therefore the primary object of the present invention to provide a novel process of treating gastrointestinal upsets in ruminants wherein a quantity of a reducing agent is administered to the afflicted ruminant and in an amount capable of supporting the development of the digestive organisms normally present in the rumen of the animal to overcome the extreme acidosis in the digestive system of the animal and to counteract those agents in the rumen which operate to produce weakly dissociated organic acids.

It is another important object of the invention to provide a process for treating gastrointestinal upset in a ruminant wherein a composition is administered to the animal capable of increasing the pH in the rumen of the ruminant, along with producing a significant decrease in the rH level therein so as to support the development of the normal digestive organisms present in the rumen whereby sufficient relief is afforded to the animal to permit the metabolic processes of the ruminant's system to return to normal as rapidly as practicable.

A still further important object of the invention is to provide a method of treating gastrointestinal upset in a ruminant wherein the composition administered to the afflicted animal includes an antispasmodic cooperable with the reducing agent to assure the most rapid return of the digestive processes to normal condition.

Also an important object of the invention is to provide a method of treating digestive upsets in ruminants wherein the composition referred to above is in a form permitting oral dosage thereof for ease of administration and at a practicable cost.

Other objects of the present invention and details of the instant method will become obvious or be explained in greater detail as the description progresses.

The process of this invention involves administration to an animal afflicted with digestive upset, of a composition including a substance for increasing the pH in the animal's rumen, an oxygen reducing agent capable of supporting the development of the digestive organisms normally present in such rumen, an antispasmodic cooperable with the alkalizing substance and the reducing agent, and a material which is adapted to enhance the reproduction of digestive organisms in the rumen even under alkaline conditions.

A formulation prepared in accordance with the preferred concepts of the present invention includes the admixture of sodium formaldehyde sulfoxylate, pyrocatechol and aminopyrine as the major active ingredients and normally admixed with a quantity of sodium bicarbonate as an alkalizing substance. In addition, magnesium oxide and an admixture of wood and vegetalbe charcoal may also be combined with the active ingredients in order to reduce the hygroscopicity of the admixture. A suitable preferred formulation is as follows:

|  | Parts by wt. |
|---|---|
| Sodium bicarbonate | 128 |
| Pyrocatechol | 11 |
| Sodium formaldehyde sulfoxylate (powdered) | 30 |
| Magnesium oxide | 2 |
| Aminopyrine | 67 |
| Wood charcoal | 1 |
| Activated vegetable charcoal (Nuchar) | 1 |

The sodium bicarbonate is placed in a mixer and the other ingredients are added slowly in the order listed. If any ingredient is not powdered and free from lumps, it must be passed through a hammermill or fine screen before adding to the batch. Since the mixture is relatively hygroscopic, the composition must be kept covered and not overmixed.

The recommended dosage for an adult bovine is 1½ oz. given daily until it appears that the ruminant has completely recovered from the digestive upset. For smaller animals, the amount of material administered should be reduced accordingly. Although the recommended dosage may be repeated at any time within 12 to 24 hours from the initial dose, it has been found that up to 3 or 4 doses may be given simultaneously in very severe cases without adverse results. The 1½ oz. dose is preferably dissolved in 1 quart of water and administered either as a drench or by a stomach tube. An alternative administration involves giving the animal small undissolved portions of the powder until the complete dose has been consumed.

The sodium formaldehyde sulfoxylate functions as a reducing agent to decrease the high rumen rH value which is commonly found in alimentary intoxications associated with digestive upsets where the animal has consumed excessive amounts of grain or other high carbohydrate materials. Reduction of the rH value in the rumen is required to support normal fermentation processes and bacterial growth in the rumen, with the agent acting in a reducing capacity in an acid medium. The sulfoxylate reducing agent provides a more favorable climate within the rumen of the animal for the digestive organisms normally present therein, and assures most efficient metabolism of the material without production of excessive quantities of the weakly dissociated organic acids which would produce excessive acidosis. The enzymatic processes of the rumen are possible only because of the metabolic decomposition of the food caused by the bacteria in the stomach, and therefore by providing a favorable environment for the bacteria, it can be recognized that the grain or other high carbohydrate material is converted to utilizable lower fatty acids rather than lactic acids that operate to produce toxic reactions in the animal's system. As previously discussed, a high rH level is not conducive to propagation of digestive organisms in the rumen, and therefore the reducing action of the sulfoxylate complex is effective in preventing toxic products from being produced in the rumen to an extent to endanger the life of the animal provided a sufficient quantity of the reducing material is administered to the ruminant.

The pyrocatechol supports the reducing action of the sodium formaldehyde sulfoxylate, particularly under conditions wherein the rumen is on the alkaline side. It can be appreciated that the relatively large quantity of sodium bicarbonate introduced into the rumen, can have the effect of raising the pH of the contents of the rumen to a level above 7, and under these conditions, the pyrocatechol would function to support the growth of the digestive organisms in the rumen notwithstanding the alkaline nature of the rumen. The more important function of the pyrocatechol however, is its ability to inhibit the growth of adverse microorganisms in the rumen, and particularly the lactic acid forming organism *Streptococcus bovis*. Pyrocatechol is preferred because this material inhibits the undesirable organisms but does not completely inhibit the growth of Gram-negative organisms and protozoa.

The antispasmodic, aminopyrine, is cooperable with the reducing agents to effectively overcome the adverse effects of the overloading of the rumen with grain and other high carbohydrates by not only preventing undesirable spasms in the ruminant's stomach, but also correcting abnormal permeability of the resorbing vessels of the animal's gastrointestinal system. The aminopyrine is effective in reducing both liver swelling and pain and exerts an analgesic action along with antispasmodic effects. The closely related dipyrone may be substituted for the aminopyrine in certain instances, with equally good results.

The alkalizing agent, which is primarily sodium bicarbonate, rapidly increases the pH of the rumen to overcome the acidosis that would otherwise be produced by an excess of free hydrogen ions in the animal's stomach. The magnesium oxide cooperates with the sodium bicarbonate to alkalize the rumen and restore the pH thereof to a normal level. The magnesium oxide also cooperates with the wood and vegetable charcoal fractions for reducing the hygroscopicity of the over-all composition and preventing caking of the product during production and packaging thereof, and for a limited period after opening of individual packets of the product.

Having thus described the invention, what is claimed as new and desired to be secured by Letters Patent is:

1. A process for treating indigestion and alimentary intoxication associated therewith in a ruminant comprising orally administering to the ruminant so afflicted, a quantity of a composition including a sufficient amount of sodium formaldehyde sulfoxylate to support the development of the digestive organisms normally present in the rumen of the animal, and an effective quantity of an antispasmodic selected from the group consisting of aminopyrine and dipyrone.

2. A process as set forth in claim 1 wherein said antispasmodic is dipyrone.

3. A process as set forth in claim 1 wherein said antispasmodic is aminopyrine.

4. A process of treating indigestion and alimentary intoxication associated therewith in a ruminant comprising orally administering to the ruminant so afflicted, a quantity of a composition including a sufficient amount of sodium formaldehyde sulfoxylate to support the development of the digestive organisms normally present in the rumen of the animal, and effective quantities of an antispasmodic selected from the group consisting of aminopyrine and dipyrone, and an alkalizing material cooperable therewith.

5. A process as set forth in claim 4 wherein said material is sodium bicarbonate.

6. A process as set forth in claim 4 wherein said material is magnesium oxide.

7. A process as set forth in claim 4 wherein said material comprises an admixture of sodium bicarbonate and magnesium oxide.

8. A process for treating indigestion and alimentary intoxication associated therewith in a ruminant comprising orally administering to the ruminant so afflicted, a quantity of a composition including sodium formaldehyde sulfoxylate, pyrocatechol, aminopyrine and sodium bicarbonate.

9. A process for treating indigestion and alimentary intoxication associated therewith in a ruminant comprising orally administering to the ruminant so afflicted, a quantity of a composition including sodium formaldehyde sulfoxylate, pyrocatechol, aminopyrine, sodium bicarbonate, magnesium oxide, wood charcoal and activated charcoal.

10. A process for treating indigestion and alimentary intoxication associated therewith in a ruminant comprising orally administering to the ruminant so afflicted, a quantity of a composition including in approximate relative proportions by weight, 30 parts of sodium formaldehyde sulfoxylate, 11 parts of pyrocatechol, 67 parts of aminopyrine and 123 parts of sodium bicarbonate.

11. A process for treating indigestion and alimentary intoxication associated therewith in a ruminant comprising orally administering to the ruminant so afflicted, a quantity of a composition including in approximate parts by weight, 30 parts of sodium formaldehyde sulfoxylate and 67 parts of aminopyrine.

12. A process for treating indigestion and alimentary intoxication associated therewith in a ruminant comprising orally administering to the ruminant so afflicted, a quantity of a composition including in approximate parts by weight, 30 parts of sodium formaldehyde sulfoxylate, 67 parts of aminopyrine and 123 parts of sodium bicarbonate.

References Cited in the file of this patent

Milks' Veterinary Pharmacology Materia Medica and Therapeutics, Sixth Edition, 1949, Alex Eger, Chicago, Ill., pages 249–250 and 362 and 586.

U.S. Dispensatory, 23rd Edition, 1943, Lippincott Co., Philadelphia, Pa., pages 1490 and 1522.